United States Patent
Göring

(10) Patent No.: US 7,806,421 B2
(45) Date of Patent: Oct. 5, 2010

(54) HANDLE STEM FOR A BICYCLE

(75) Inventor: Thomas Göring, Karlsruhe (DE)

(73) Assignee: KHE Fahrradhandels GmbH, Karlsruhe (DE)

( * ) Notice: Subject to any disclaimer, the term of this patent is extended or adjusted under 35 U.S.C. 154(b) by 188 days.

(21) Appl. No.: 12/069,291

(22) Filed: Feb. 8, 2008

(65) Prior Publication Data

US 2009/0199675 A1    Aug. 13, 2009

(51) Int. Cl.
*B62K 21/18* (2006.01)

(52) U.S. Cl. ........................ 280/280; 280/279

(58) Field of Classification Search ................. 280/280, 280/279

See application file for complete search history.

(56) References Cited

U.S. PATENT DOCUMENTS

| | | | | | |
|---|---|---|---|---|---|
| 4,616,523 | A | * | 10/1986 | Jones | 74/502.2 |
| 4,653,768 | A | * | 3/1987 | Keys et al. | 280/279 |
| 4,753,448 | A | * | 6/1988 | Nagashima | 280/264 |
| 4,770,435 | A | * | 9/1988 | Cristie | 280/279 |
| 5,553,511 | A | * | 9/1996 | Marui | 74/551.1 |
| 5,588,336 | A | * | 12/1996 | Chou | 74/551.1 |
| 5,737,974 | A | * | 4/1998 | Chen | 74/551.1 |
| 5,782,479 | A | * | 7/1998 | Adams et al. | 280/279 |
| 5,881,606 | A | * | 3/1999 | Roddy | 74/551.3 |
| 6,058,800 | A | * | 5/2000 | Giard | 74/551.1 |
| 6,224,079 | B1 | | 5/2001 | Göring | |
| 6,422,353 | B1 | * | 7/2002 | Lin | 188/24.11 |
| 7,204,349 | B2 | | 4/2007 | Göring | |
| 7,407,176 | B2 | * | 8/2008 | McJunkin et al. | 280/279 |
| 2005/0248120 | A1 | * | 11/2005 | McJunkin et al. | 280/279 |
| 2006/0097474 | A1 | * | 5/2006 | Liao | 280/279 |
| 2008/0073870 | A1 | * | 3/2008 | Lane | 280/280 |
| 2009/0079160 | A1 | * | 3/2009 | Lai | 280/279 |
| 2009/0096185 | A1 | * | 4/2009 | Wu et al. | 280/279 |

FOREIGN PATENT DOCUMENTS

| | | | |
|---|---|---|---|
| DE | 20 2007 014 200 U1 | 12/2007 | |
| GB | 2 217 407 A | 10/1989 | |

OTHER PUBLICATIONS

U.S. Appl. No. 11/711,508, filed Feb. 27, 2007; In re: Thomas Göring, entitled Rotor System for a Bicycle.

* cited by examiner

*Primary Examiner*—Lesley Morris
*Assistant Examiner*—Michael R Stabley
(74) *Attorney, Agent, or Firm*—Womble Carlyle Sandridge & Rice, PLLC

(57) ABSTRACT

A handle stem for a bicycle, having a body and a lid, which can be fixed to the body, the body and the lid forming together a handle bar receptacle for receiving the handle bar of the bicycle, has a clamping ring being formed separate from the body and being inserted into a ring receptacle of the body for receiving the forked shaft of a fork of the bicycle.

19 Claims, 3 Drawing Sheets

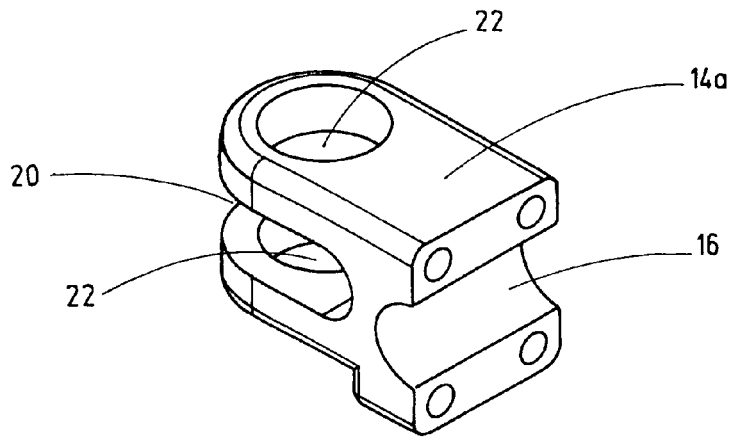
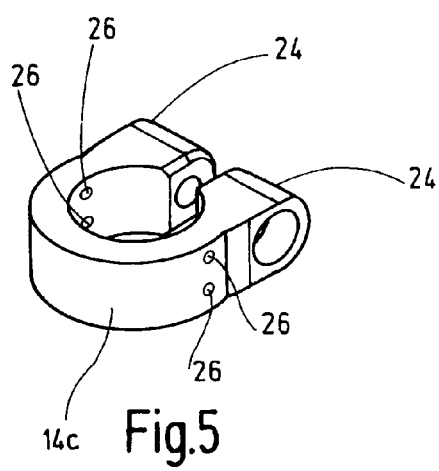
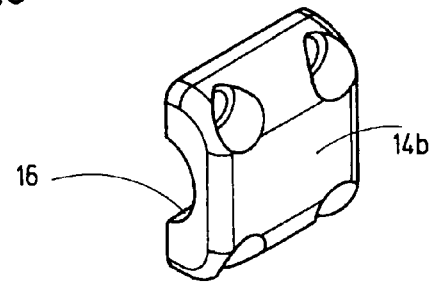
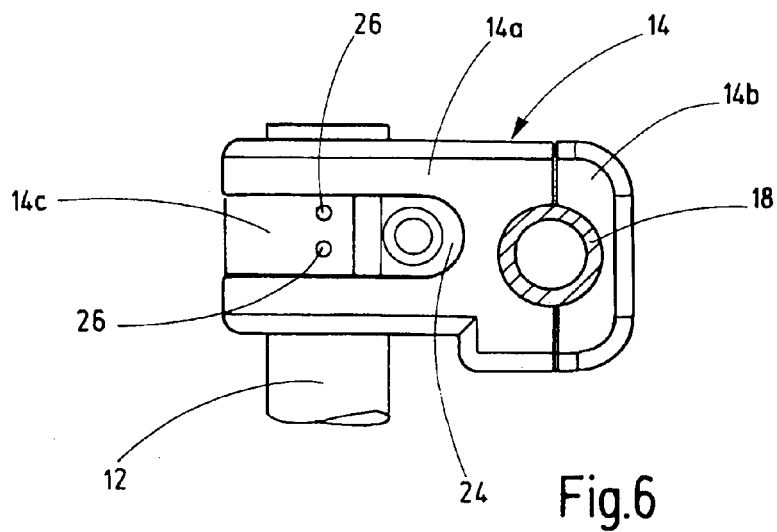

HANDLE STEM FOR A BICYCLE

TECHNICAL FIELD

The present invention relates to a handle stem for a bicycle, and more particularly relates to handle stem having a body and a lid for being fixed to the body, with the body and the lid together forming a handle bar receptacle for receiving the handle bar of the bicycle.

BACKGROUND OF THE INVENTION

U.S. patent application Ser. No. 11/711,508 discloses a handle stem of the type described above, which is mounted on the shaft of the fork by pressing, or the like.

BRIEF SUMMARY OF SOME ASPECTS OF THE INVENTION

An aspect of the present invention is the provision of improvements to a handle stem of the type described above. In accordance with one aspect of the present invention, a handle stem for a bicycle includes a body and a clamping ring. The body defines a ring receptacle for receiving the claiming ring, and the body further at least partially forms a handle bar receptacle for receiving the handle bar. The clamping ring is formed separately from the body, is inserted into the ring receptacle of the body, and is for receiving the shaft of the fork of the bicycle. Thus, and as compared to mounting by pressing, the handle stem is easier to mount on the shaft of the fork. The clamping ring may deform while the ring is being fixed on the shaft of the fork, while the body stays undeformed.

The handle stem may further include a lid, which can be fixed to the body, with the body and the lid together forming the handle bar receptacle for receiving the handle bar of the bicycle.

Other aspects and advantages of the present invention will become apparent from the following.

BRIEF DESCRIPTION OF THE DRAWINGS

The invention is explained in more detail below with reference to an exemplary embodiment depicted in the drawings. They show:

FIG. 3 a perspective view of the body,

FIG. 4 a perspective view of the lid,

FIG. 5 a perspective view of the clamping ring,

FIG. 6 a right side view of the exemplary embodiment, and

DETAILED DESCRIPTION OF EXEMPLARY EMBODIMENT

Figure 1:
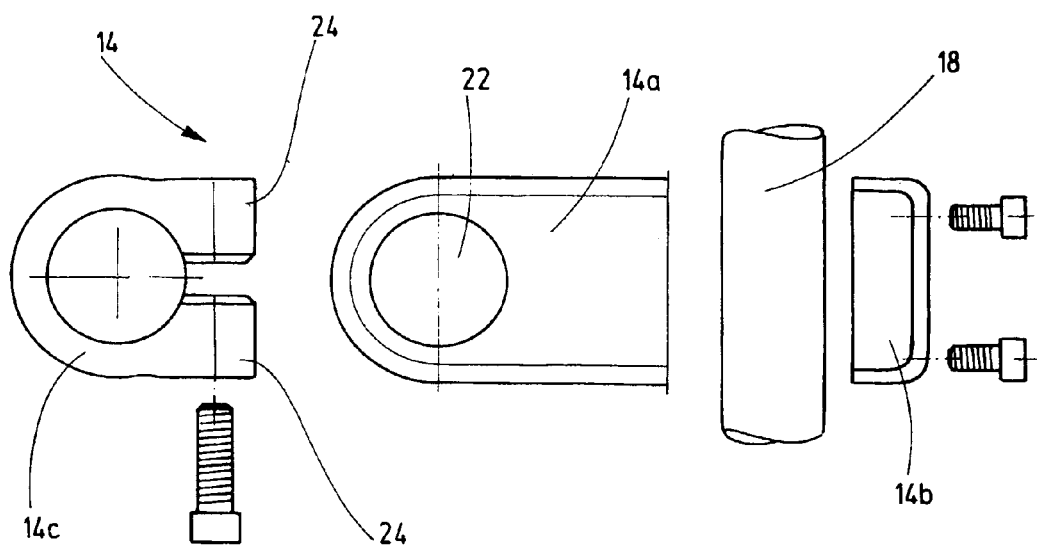
FIG. 1 an exploded top view of the exemplary embodiment.
Figure 2:
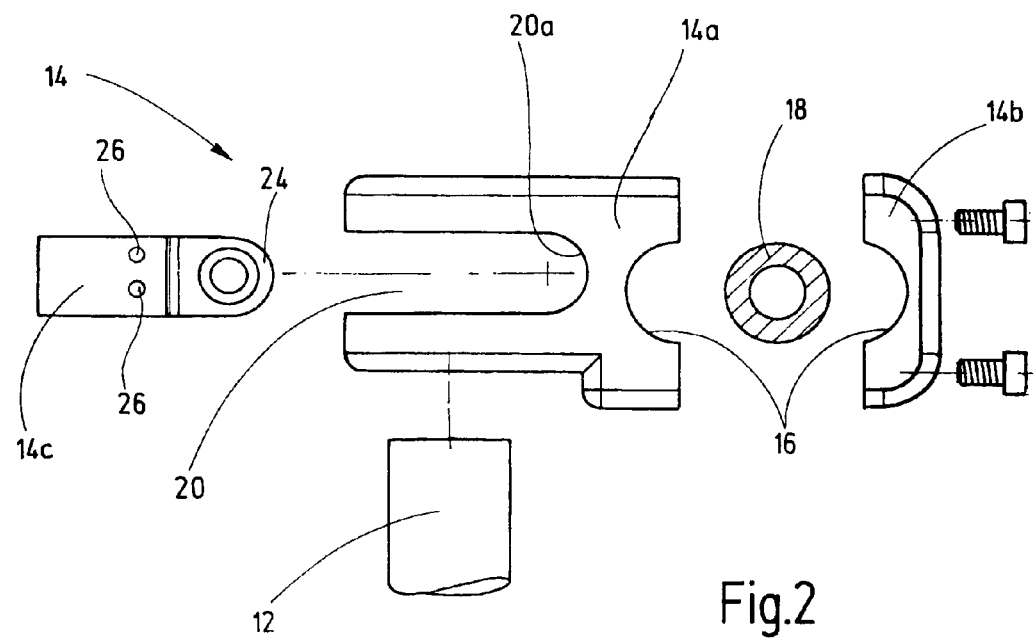
FIG. 2 an exploded right side view of the exemplary embodiment.
Figure 7:
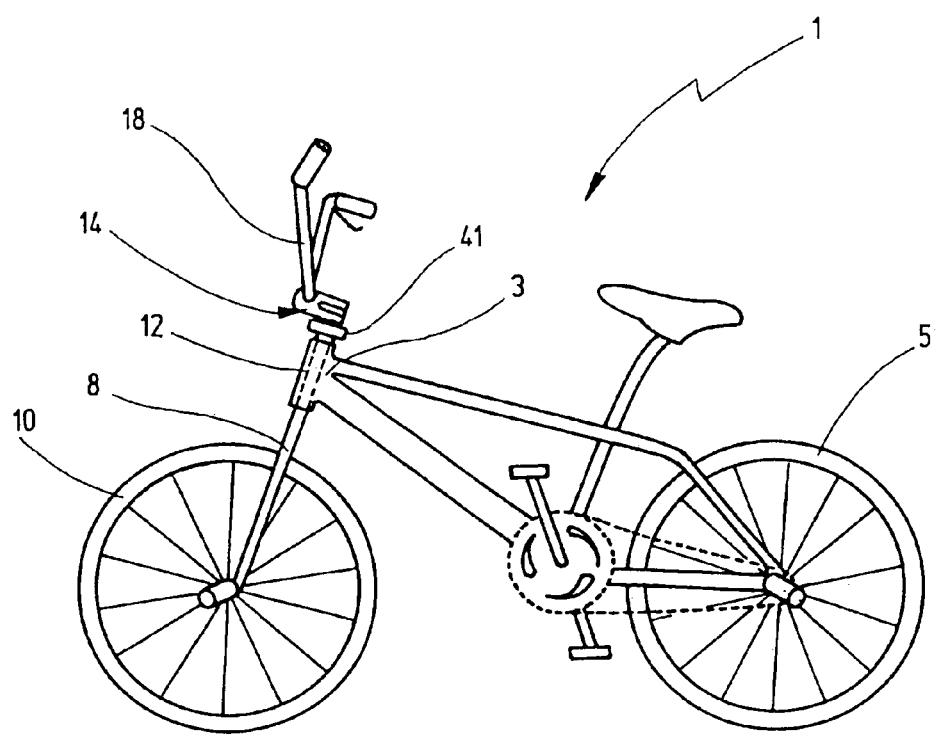
FIG. 7 a left side view of a bicycle equipped as specified by the invention.

Bicycle 1 has a frame 3 that supports rear wheel 5 at the rear of bicycle 1. The front end of frame 3 bears a forked shaft such that the forked shaft can rotate. The lower end of the forked shaft is in the form of a fork 8, and the upper end of the forked shaft is in the form of a shaft 12 (e.g., the shaft of the fork). Fork 8 bears the front wheel 10 of bicycle 1 on its lower end. A handle stem 14 is mounted on shaft 12. The normal position of handle stem 14 on shaft 12 determines the directional parameters used below.

Handle stem 14 comprises a body 14a and a lid 14b (e.g., cover, cap, mounting bracket, or the like), which may be screwed onto the body 14a or fixed in another way to body 14a. Body 14a and lid 14b each comprise half-cylindrical recesses, which form together a horizontal handle bar receptacle 16. For fixing a handle bar 18 of bicycle 1 to the handle stem 14, handle bar 18 is inserted into the handle bar receptacle 16, and lid 14b is fixed on body 14a. Body 14a further comprises a ring receptacle 20 designed as a slot that extends toward the handle bar 18. However, the ring receptacle 20 ends at a terminal surface 20a that is distant from handle bar receptacle 16. Body 14a also comprises two openings 22 that are aligned with each other in a direction perpendicular to the ring receptacle 20 and perpendicular to the handle bar 18.

Handle stem 14 further comprises a clamping ring 14c that is formed separate from body 14a. Along its circumference, the clamping ring 14c is discontinuous so that it includes ends 24 which may approach one another, e.g. may be screwed together. Instead of screwing together the ends 24, the ends 24 may approach one another by being pressed together by an eccentric, with the eccentric being pivotably mounted on a screw, and the screw penetrating a borehole of one end 24 and being screwed into the other end 24. Clamping ring 14c is inserted into ring receptacle 20 in a form-fitting manner, so that the center (opening) of clamping ring 14c is aligned with openings 22, and ends 24 abut terminal surface 20a.

For fixing handle stem 14 to shaft 12, shaft 12 is inserted into: the lower of the two openings 22, the center (opening) of clamping ring 14c, and the upper of the two openings 22. Thus shaft 12 is enclosed by clamping ring 14c and the surfaces that respectively extend around and define the two openings 22. Then, ends 24 are moved toward one another, e.g. by the ends 24 being screwed together, whereby two different effects occur: by reducing its diameter, clamping ring 14c is fixed to shaft 12; and by bringing the ends 24 toward one another, the outer edges of ends 24 press against terminal surface 20a, thereby pushing clamping ring 14c away from terminal surface 20a and pressing shaft 12 against the forward surfaces of openings 22 in body 14a (i.e., the shaft 12 is pressed against forward portions of the surfaces that respectively extend around and define the openings 22). As a result, clamping ring 14c is fixed to body 14a by way of the shaft 12 (e.g., both the clamping ring 14c and the body 14a are fixedly straddled against the shaft 12 in a radial direction of the shaft 12).

Clamping ring 14c also comprises attaching points 26, actually two pairs of boreholes, i.e. four boreholes, used for attaching a rotor 41 to handle stem 14.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A handle stem for a bicycle having a handle bar and a fork with a shaft, the handle stem comprising:
    a body and a clamping ring, wherein
    the clamping ring includes tightening means for causing the clamping ring to constrict, and the clamping ring, which includes the tightening means, is formed separately from the body;
    the body at least partially defines a handle bar receptacle for receiving the handle bar;
    the body defines a slot that extends toward the handle bar receptacle, and the slot is for receiving the clamping ring;

the body includes an opening to the slot, and the opening is for receiving the shaft of the fork; and the clamping ring and the body are cooperatively adapted so that the clamping ring is for being inserted into the slot of the body, the clamping ring and the opening are for simultaneously being in receipt of the shaft of the fork while the clamping ring is within the slot, and the clamping ring, the body and the shaft of the fork are for being fixedly connecting to one another in response to the tightening means of the clamping ring causing the clamping ring to both constrict onto the shaft of the fork and press against the body while the clamping ring is in the slot and the shaft of the fork is in both the clamping ring and the opening, so that the clamping ring pushes against the shaft of the fork, and the shaft of the fork presses against the body.

2. The handle stem of claim 1, wherein:

the clamping ring is discontinuous and thereby includes ends, and the ends may approach one another in response to operation of the tightening means.

3. The handle stem of claim 2, wherein:

the clamping ring is within the slot of the body, the clamping ring is in receipt of the shaft of the fork, and the shaft of the fork is fixed to the clamping ring by way of the ends being forced toward one another by the tightening means.

4. The handle stem of claim 1, wherein the slot comprises a terminal surface, and the clamping ring abuts the terminal surface.

5. The handle stem of claim 1, wherein:

the opening is one of two aligned openings of the body, and the two aligned openings are each for receiving the shaft of the fork while the clamping ring is simultaneously within the slot and in receipt of the shaft of the fork.

6. The handle stem of claim 5, wherein the slot comprises a terminal surface, and the clamping ring abuts the terminal surface.

7. The handle stem of claim 6, wherein:

the clamping ring is discontinuous and thereby includes ends, and the ends may approach one another.

8. The handle stem of claim 7, wherein:

the shaft of the fork is within the aligned openings;

the clamping ring is within the slot of the body;

the clamping ring is in receipt of the shaft of the fork; and the ends of the ring are urged toward one another by the tightening means so that the shaft of the fork is fixed to the clamping ring, the ends of the clamping ring are pressed against the terminal surface, the clamping ring is straddled against the shaft, and the body is straddled against the shaft.

9. The handle stem of claim 1 in combination with the bicycle.

10. The handle stem of claim 1, comprising a lid for being fixed to the body, wherein the body and the lid are for together forming the handle bar receptacle.

11. The handle stem of claim 2, comprising a lid for being fixed to the body, wherein the body and the lid are for together forming the handle bar receptacle.

12. The handle stem of claim 8, comprising a lid fixed to the body, wherein the body and the lid together form the handle bar receptacle.

13. The handle stem of claim 9, comprising a lid for being fixed to the body, wherein the body and the lid are for together forming the handle bar receptacle.

14. The handle stem of claim 2, wherein the tightening means comprises a screw for screwing together the ends of the clamping ring.

15. The handle stem of claim 5, wherein the two openings are aligned with one another in a direction that is perpendicular to the slot.

16. A handle stem for a bicycle having a handle bar and a fork with a shaft, the handle stem comprising:

a clamping ring defining an opening that extends through the clamping ring and is in receipt of the shaft of the fork, wherein the clamping ring is discontinuous so that the clamping ring includes ends, and the ends of the clamping ring are proximate one another so that the clamping ring is clamped onto the shaft of the fork;

a body formed separately from the clamping ring, wherein the body includes opposite front and rear ends, the body at least partially defines a handle bar receptacle that is positioned at the front end of the body, the body defines a slot that is in receipt of the clamping ring, the slot extends from the rear end of the body toward the front end of the body, the slot comprises a forward terminal surface positioned between the front and rear ends of the body, the body defines upper and lower openings to the slot, the slot is positioned between the upper and lower openings, the upper and lower openings are each in receipt of the shaft of the fork, the ends of the clamping ring are pushing forwardly against the forward terminal surface so that the clamping ring is pushing rearwardly against the shaft of the fork, and the shaft of the fork is pushing rearwardly against rearward surfaces of the upper and lower openings in response to the clamping ring pushing rearwardly against the shaft of the fork, so that the clamping ring, the shaft of the fork, and the body are fixedly connected to one another.

17. The handle stem of claim 16, wherein the clamping ring includes tightening means for forcing the ends of the clamping ring toward one another so that the clamping ring is clamped onto the shaft of the fork and the ends of the clamping ring are pushing forwardly against the forward terminal surface.

18. The handle stem of claim 16, wherein the shaft of the fork extends completely through each of the upper and lower openings to the slot.

19. The handle stem of claim 16, wherein the upper and lower openings to the slot are aligned with one another in a direction that is perpendicular to the slot.

* * * * *